United States Patent [19]

Dennis, Jr.

[11] 3,724,883
[45] Apr. 3, 1973

[54] PRELEADED DRAINPIPE CONNECTOR
[75] Inventor: John M. Dennis, Jr., Renton, Wash.
[73] Assignee: Charles Shane, Renton, Wash.
[22] Filed: Jan. 18, 1971
[21] Appl. No.: 107,339

[52] U.S. Cl..................................285/291, 285/423
[51] Int. Cl.................................................F16l 13/00
[58] Field of Search......285/291, 423, 56, 57, 58, 59, 285/60, 284, 295; 4/252

[56] References Cited

UNITED STATES PATENTS 1,461,482  7/1923  Hahn...................................285/284
2,011,681  8/1935  Holteman............................285/284

FOREIGN PATENTS OR APPLICATIONS 18,773   0/1902  Great Britain......................285/291
625,494  8/1961  Canada.................................285/59
346,557  4/1931  Great Britain......................285/291

Primary Examiner—Dave W. Arola
Attorney—Robert W. Beach

[57] ABSTRACT

A lead caulking collar adapted to seat in a drainfitting thimble is precast around an adaptor or stub for connection to a drainpipe.

4 Claims, 8 Drawing Figures

PATENTED APR 3 1973 3,724,883

INVENTOR
JOHN M. DENNIS, JR.
BY
Robert W. Beach
ATTORNEY

PRELEADED DRAINPIPE CONNECTOR

In plumbing practice the most satisfactory joints for drains where a screwed connection cannot be made are formed by caulking a collar of solid lead between two interfitting pipes. Customarily lead is melted in a pot in a portable furnace and is poured from the pot into the joint in one or more pours and then caulked. While such joints properly made are most satisfactory, unsatisfactory joints can result from using insufficient lead or from pouring lead at too low a temperature, so that the joint is improperly filled. In an effort to save the time and expense of making a solid lead caulked joint, substitutes such as caulked lead wool or mastic are frequently used.

The principal object of the present invention is to enable a good caulked, solid leaded joint to be made reliably and economically.

More specifically it is an object to enable such a caulked solid leaded joint to be made without requiring the plumber to have lead melting equipment or to take the time required to utilize such equipment.

A further object is to avoid waste of lead from pouring lead for a joint on a job and also avoid the work of cleaning up spilled lead and the waste entailed.

It is also an object to assure the provision of adequate lead properly distributed around a joint to make a proper caulked joint.

A further object is to provide a preleaded connector which can be assembled accurately and quickly.

An additional object is to enable a caulked solid leaded joint to be used effectively for making a connection to plastic type without injuring plastic parts by overheating them.

Another object is to provide a method for making preleaded pipe connectors quickly and without injuring plastic parts of the connector by overheating.

Figure 4:
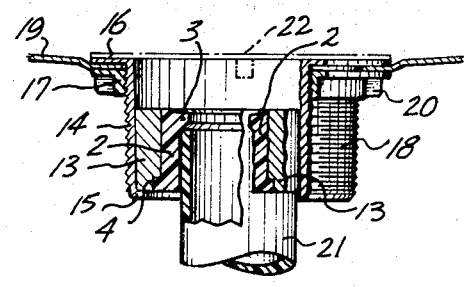

FIG. 4. is a side elevation of a preleaded drainpipe connector installed in a drain, parts being broken away.

Figure 5:
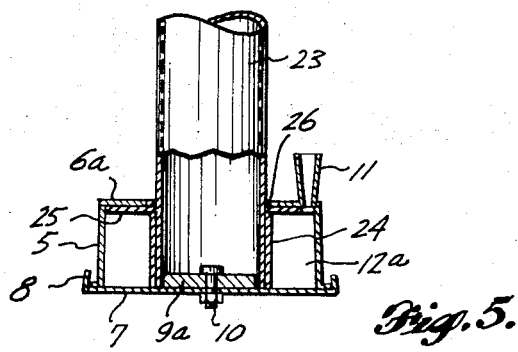

FIG. 5 is an elevation of a mold for making a modified type of preleaded drainpipe connector, parts being broken away.

Figure 6:
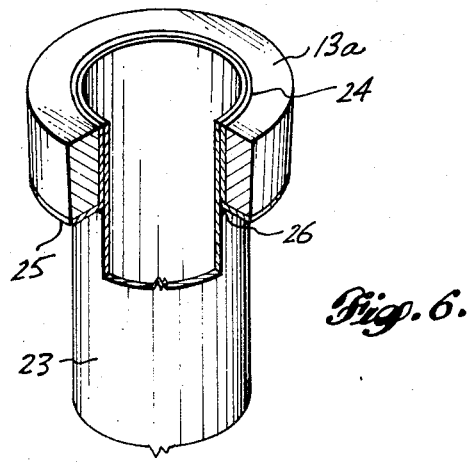

FIG. 6 is a top perspective of the modified type of preleaded drainpipe connector made in a mold such as shown in FIG. 5 and having parts broken away.

Figure 7:
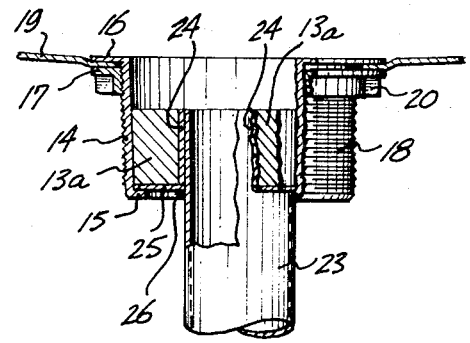

FIG. 7 is an elevation of a preleaded drainpipe connector of the type shown in FIG. 6 installed in a drain, with parts broken away.

Figure 8:
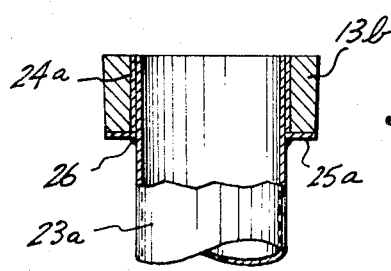

FIG. 8 is an elevation of a preleaded drainpipe connector generally of the type shown in FIGS. 6 and 7, but utilizing a pipe of different size, with parts broken away.

Figure 1:
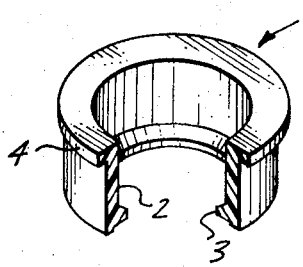
FIG. 1 is a top perspective of a conventional plastic pipe adaptor used in the connector of the present invention with parts broken away.

The preleaded drainpipe connector of the present invention can be constructed for use either with plastic drainpipe or with metal drainpipe such as copper. FIGS. 1 to 4 inclusive are directed to a drainpipe connector for use with plastic drainpipe. The female adaptor 1 shown in FIG. 1 is made of hard, rigid plastic material such as polyvinyl chloride, which includes a cylindrical stub 2 constituting a socket into which the end of a drainpipe can be fitted.

An internal abutment flange 3 projects inward from one end of the stub to limit the penetration into the adaptor of a pipe end. An external flange 4 projects outwardly from the opposite end of the stub to serve as a seat for caulking material. A collar of solid lead is precast around this adaptor to provide the preleaded drainpipe connector. Such collar is considerably thicker than the stub thickness and has an end substantially flush with an end of the stub with a substantially square outer corner and a thickness at least substantially as great as the thickness of the corresponding stub end.

Figure 2:
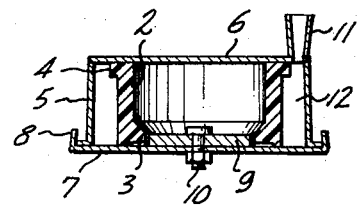
FIG. 2 is a transverse vertical section through a mold housing an adaptor ready to be poured.

To cast the solid lead collar around the adaptor such adaptor is placed in a mold of the type shown in FIG. 2. The cope of this mold includes a cylindrical side wall 5 and a circular end wall 6. The open end of the cope is closed by the drag including a plate 7 having tabs or ears 8 which snap over a lip on the cope to hold the cope and the drag together. An adaptor-locating boss 9 is secured to the underside of the drag plate 7 by a bolt 10. Such boss is of a size to fit snugly within the abutment flange 3 of the adaptor 1.

Molten lead can be poured through the sprue tube 11 into the annular mold space 12 between the adaptor and the mold. The temperature of the lead should be sufficiently high so that such annular space will be filled quickly and completely with molden lead, and as soon as the lead in the sprue has congealed, the entire mold can be immersed in warm water to remove heat sufficiently quickly from the metal so that it will not char the plastic.

Figure 3:
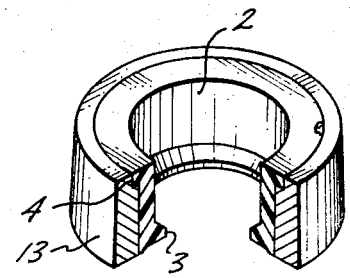
FIG. 3 is a top perspective of a completed preleaded drainpipe connector with parts broken away.

When the metal has been cooled sufficiently in the mold space 12, the drag and cope are separated and the completed preleaded drainpipe connector shown in FIG. 3 is withdrawn. The precast lead collar 13 is integrated with the adaptor 1 and the external flange 4 is disposed in axially-overlapping relationship with a portion of the collar as shown in FIG. 3. The external periphery of the collar 13 is exposed and one end is flush with one end of the adaptor, radially overlapping its flange 3. The outer corner of such collar end is substantially square so that it can be caulked. The exterior wall of the collar has sufficient draft so that it can be removed easily from the cope. Such preleaded drainpipe connector can be installed readily in the thimble 14 of a drain in the manner shown in FIG. 4. The lead collar is sufficiently large so that its lower end will seat on the inturned flange 15 on the lower edge of the thimble.

The thimble is installed by clamping between its upper flange 16 and clamping nut 17, engaged with threads 18 on the exterior of the thimble, the margin of a thimble-receiving aperture in the floor pan 19 of a metal shower, for example. The nut 17 is tightened to clamp such aperture margin by engagement with projections 20 on the nut. When the thimble has thus been installed, a drainpipe 21 of plastic material can be inserted upward through the spindle into the socket of the adaptor 2, which can be bonded to the pipe end. With the preformed solid lead ring 13 seating on the flange 15, the upper edge of such ring and particularly its outer square corner can then be peened with a caulking iron to caulk the ring into intimate engagement with the inner wall of the thimble to complete the drain connection. The top of the thimble can then be closed by a conventional perforated cover 22.

FIGS. 5 to 7 relate to a preleaded drainpipe connector intended for use with metal drainpipe preferably of copper. FIG. 5 shows the mold including a cope having a cylindrical wall 5, one edge of which is integral with an annular end wall 6a. The central portion of such end wall has in it an aperture for projection through it of a copper type stub 23. The end portion of such stub within the mold is reinforced by a metal collar 24 fitting closely around the stub 23.

An annular rigid plate 25, preferably of copper, also received within the mold is spaced from the stub end by the collar 24. Such collar and annular plate are integrated with the stub 23 such as by a soldered joint 26. The end of the stub 23 within the mold is located with respect to the plate 7 of the drag by the boss 9a fitting snugly within the end of the stub 23 and held in place by the bolt 10.

The reinforcing collar 24 and annular plate 25 are of course assembled onto the end portion of the stub 23 before the stub is inserted into the mold. The stub is then passed through the aperture in the cope end 6a and the cope and drag are assembled with the boss 9a fitting into the end of the stub 23 so as to form the annular lead-receiving cavity 12a. Molten lead is then poured through the sprue tube 11 into such cavity, after which the mold is immersed in warm water to remove heat quickly from the lead as discussed above in connection with the molding process utilizing the mold of FIG. 2.

The completed preleaded drainpipe connector shown in FIG. 6 includes the precast, solid lead collar 13a. Such connector is installed in a thimble 14, as shown in FIG. 7, generally in accordance with the procedure described above in connection with FIG. 4. After the thimble 14 has been installed in the aperture of the shower floor pan 19, the stub 23 of the drainpipe connector can be dropped down through the thimble until its base plate 25 seats on the flange 15. The precast collar 13a will then fit snugly within the thimble 14. The upper edge of the lead collar can then be peened with a caulking iron to flare such collar into intimate engagement with the inner wall of the thimble.

The construction of the preleaded drainpipe connector shown in FIG. 8 is of the same type as described in connection with FIGS. 5 and 6, except that in this instance the drainpipe stub 23a is of larger diameter as compared to the external diameter of the solid lead collar 13b. The metal reinforcing collar 24a is also larger, and the aperture in the annular base plate 25a through which the stub 23a passes is also larger. Even though the external diameter of the lead ring 13b is the same size as the external diameter of the lead collar 13a shown in FIG. 6, the radial thickness of the lead collar 13b is still adequate to provide effective sealing when it is caulked.

The peening action of the solid lead collar 13a or 13b exerts very substantial radial stress inward on the pipe stub 23 or 23a. Provision of the reinforcing metal collar 24 or 24a will prevent collapse or buckling of the copper pipe stub while insuring a tight fit between the exterior of the lead collar and the interior surface of the thimble 14. The base plate 25 or 25a will insure that the caulking operation will not extrude the lead through the lower aperture of the thimble past the flange 15. Such flange is made narrow so that the thimble can accommodate drainpipes of various size.

I claim:

1. A preleaded drainpipe connector comprising annular pipe-connecting means including a stub having an exposed internal periphery and an external periphery and a collar of solid lead having its external periphery exposed and its internal periphery encircling and integrated with said external periphery of said stub, said collar being thicker than said stub and having one end which is substantially Flush with one end of said stub, said one end of said collar having a thickness at least substantially as great as the thickness of said one end of said stub, said one end of said collar having a substantially square outer corner adapted to be caulked, said stub including an external flange fixed thereto, spaced axially of said stub from its end flush with said one collar end and engaged with said solid lead collar to deter movement of said collar longitudinally of said stub, said flange having a thickness axially of said stub which is a small fraction of the length of said stub.

2. A preleaded drainpipe connector comprising annular pipe-connecting means including a metal stub having an exposed internal periphery and an external periphery and a collar of solid lead having its external periphery exposed and its internal periphery encircling and integrated with said external periphery of said stub, said collar being thicker than said stub and having one end which is substantially flush with one end of said stub, said one end of said collar having a thickness at least substantially as great as the thickness of said one end of said stub, said one end of said collar having a substantially square outer corner adapted to be caulked, and a reinforcing collar interposed between said metal pipe stub and said solid lead collar, closely encircling and integrated with said metal pipe stub.

3. The connector defined in claim 2, and an annular, rigid plate fixed to the stub and abutting the end of the solid lead collar remote from its end substantially flush with one end of the stub and encircling the metal pipe stub.

4. A preleaded drainpipe connector comprising annular pipe-connecting means including a stub of hard plastic material having an exposed internal periphery and an external periphery and a collar of solid lead having its external periphery exposed and its internal periphery encircling and integrated with said external periphery of said stub, said collar being thicker than said stub and having one end which is substantially flush with one end of said stub, said one end of said collar having a thickness at least substantially as great as the thickness of said one end of said stub and said one end of said collar having a substantially square outer corner adapted to be caulked, said stub having an internal flange on its end substantially flush with said one end of said solid lead collar, said flange having a thickness axially of said stub which is a small fraction of the length of said stub.

* * * * *